(12) United States Patent  
Queck et al.

(10) Patent No.: US 9,348,613 B2  
(45) Date of Patent: May 24, 2016

(54) USER CONTEXT AND BEHAVIOR BASED USER INTERFACE RECOMMENDATION

(71) Applicants: Tobias Queck, Mountain View, CA (US); Sebastian Steinhauer, Santa Clara, CA (US)

(72) Inventors: Tobias Queck, Mountain View, CA (US); Sebastian Steinhauer, Santa Clara, CA (US)

(73) Assignee: SAP SE, Walldorf (DE)

( * ) Notice: Subject to any disclaimer, the term of this patent is extended or adjusted under 35 U.S.C. 154(b) by 100 days.

(21) Appl. No.: 13/651,806

(22) Filed: Oct. 15, 2012

(65) Prior Publication Data

US 2014/0108977 A1    Apr. 17, 2014

(51) Int. Cl.
  G06F 3/0481   (2013.01)
  G06F 9/44     (2006.01)

(52) U.S. Cl.
  CPC .................................. G06F 9/4443 (2013.01)

(58) Field of Classification Search
  None
  See application file for complete search history.

(56) References Cited

U.S. PATENT DOCUMENTS

| | | | |
|---|---|---|---|
| 6,778,982 B1 * | 8/2004 | Knight | G06Q 10/10 707/737 |
| 7,747,749 B1 * | 6/2010 | Erikson et al. | 709/226 |
| 7,954,064 B2 * | 5/2011 | Forstall et al. | 715/779 |
| 2002/0112082 A1 * | 8/2002 | Ko et al. | 709/246 |
| 2002/0120925 A1 * | 8/2002 | Logan | A23L 1/3002 725/9 |
| 2003/0058277 A1 * | 3/2003 | Bowman-Amuah | 345/765 |
| 2003/0093790 A1 * | 5/2003 | Logan | G06F 17/30265 725/38 |
| 2005/0033657 A1 * | 2/2005 | Herrington | G06F 17/30058 705/26.7 |
| 2006/0150107 A1 * | 7/2006 | Leung et al. | 715/745 |
| 2006/0294467 A1 * | 12/2006 | Auterinen | 715/723 |
| 2007/0277201 A1 * | 11/2007 | Wong et al. | 725/40 |
| 2008/0052739 A1 * | 2/2008 | Logan | 725/25 |

* cited by examiner

*Primary Examiner* — Phenuel Salomon

(74) *Attorney, Agent, or Firm* — Schwegman Lundberg & Woessner, P.A.

(57) ABSTRACT

Systems and methods to provide graphical user interface recommendations based on user context information and behavior are provided. In example embodiments, tracking data associated with automatically tracked actions performed at a device of a user with respect to at least one screen are received. One or more recommendations of a customized screen for an application is determined based at least in part on the tracking data for the user. The one or more recommendations of a customized screen for the application are provided to the user.

22 Claims, 7 Drawing Sheets

USER CONTEXT AND BEHAVIOR BASED USER INTERFACE RECOMMENDATION

FIELD

The present disclosure relates generally to user interfaces and, in a specific example embodiment, to user context and behavior based user interface recommendations.

BACKGROUND

Generally, a user is initially restricted to using a graphical user interface for an application that is generic for all uses. The user may change components on the graphical user interface to suit their needs. However, this may only be possible for applications that allow the user to change the graphical user interface and must be manually changed for each graphical user interface by the user.

BRIEF DESCRIPTION OF DRAWINGS

Various ones of the appended drawings merely illustrate example embodiments of the present invention and cannot be considered as limiting its scope.

DETAILED DESCRIPTION

Figure 1:
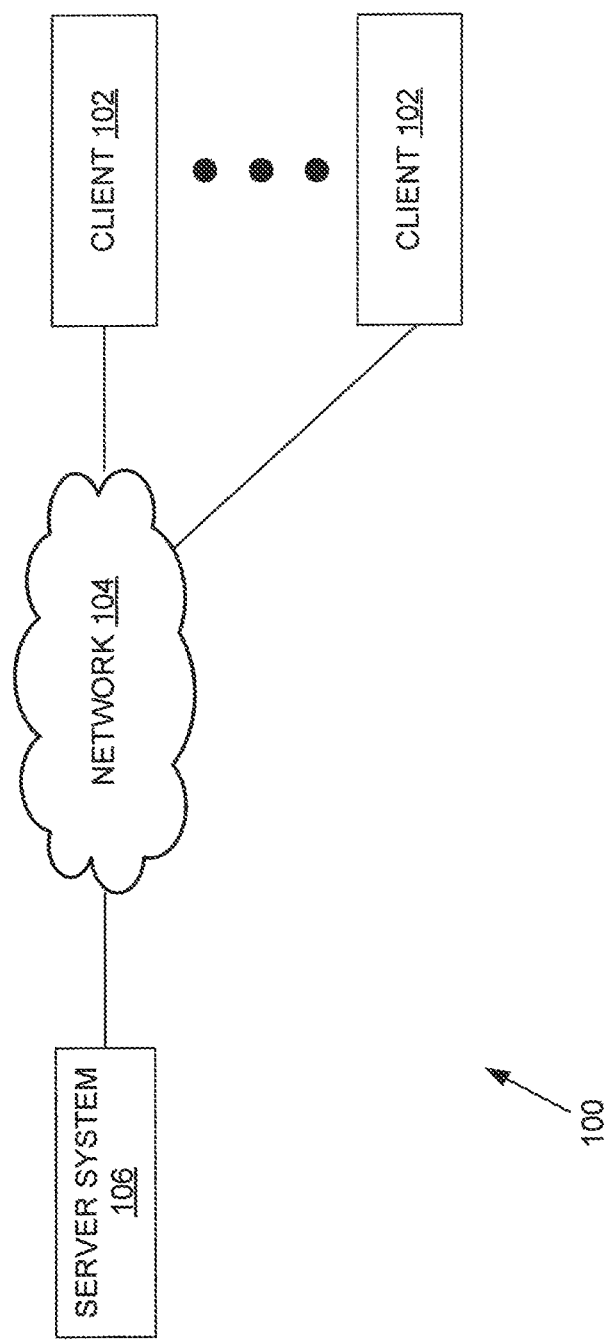
FIG. 1 illustrates an environment in which example embodiments of the inventive subject matter may be practiced.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of inventive subject matter. It will be evident, however, to those skilled in the art that embodiments of the inventive subject matter may be practiced without these specific details. In general, well-known instruction instances, protocols, structures, and techniques have not been shown in detail.

Systems and methods to provide graphical user interface (GUI) recommendations based on user context information and behavior are provided. In example embodiments, tracking data associated with automatically tracked actions performed at a device of a user with respect to at least one screen are received. One or more recommendations of a customized screen for an application is determined based at least in part on the tracking data for the user. The one or more recommendations of a customized screen for the application are provided to the user.

In some embodiments, users are able to quickly and easily apply customized adjustments to generic GUIs by selecting from recommendations provided by the system. These changed or modified GUIs may be referred to as flavors. Flavors may comprise customized GUIs created by other users. However, as more flavors are created, it may become harder for an individual user to identify flavors that may be relevant to them. As such, flavors may be rated or ranked according to the context and behavior of each individual user. The rankings may be presented to the user in a flavor gallery that, in one embodiment, may be a pop-up menu that provides a listing of flavors ordered according to behavior and context information associated with the user. It is noted that recommendations may be ranked or suggested to the user by the system not only based on the user's own interactions and behaviors, but also based on attributes associated with other users with similar roles or characteristics (e.g., similar hire date, gender, nationality). Furthermore, the user's own past customizations may also be factored in to determine further GUI recommendations. The user may then select a flavor from the flavor gallery to be used as their customized GUI. Additionally, the user may further customize the selected flavor.

In other embodiments, the system may automatically apply recommendations to the GUI for a user. For example, if an input field is almost always a certain value (e.g., 80% of the time), the system recognizes that fact and may prefill that input field for the user. In another example, if, for most of the time, the user accesses particular tabs in a tab container, unselected tabs may be removed or the constantly accessed tabs may be ordered more prominently (e.g., from left to right). Further still, if a user likes the color pink and uses that color as a background on several GUIs, the system can detect this user-preferred color change of the background to pink and may automatically provide pink backgrounds for other GUIs to the user.

By using embodiments of the present invention, the user does not need to customize all GUIs used, but have recommendations suggested or automatically applied by the system after the user has interacted with various GUIs over time or after some customizations have been applied by the user to other GUIs. Additionally, functionality in performing actions is made more efficient since only elements that are often used are presented on the customized GUI. Accordingly, one or more of the methodologies discussed herein may obviate a need for time-consuming manual GUI customization and provide more efficient functioning GUIs, which may have the technical effect of reducing computing resources used by one or more devices within the system. Examples of such computing resources include without limitation, processor cycles, network traffic, memory usage, storage space, and power consumption.

With reference to FIG. 1, an environment 100 in which example embodiments of the inventive subject matter may be practiced is shown. The environment 100 comprises a plurality of clients 102 communicatively coupled via a network 104 to a server system 106. In example embodiments, the clients 102 are user devices (e.g., laptop, desktop computer) that are linked via the network 104 with the server system 106 to allow the server system 106 to provide software functionalities to the client devices 102 (e.g., enterprise software functionalities). Accordingly, the network 104 may comprise the Internet, a wireless network, a cellular network, a Wide Area Network (WAN), a local area network (LAN), or any other type of network 4 which allows for exchange of communications.

In one embodiment, the server system 106 is an on system which is hosted by a service provider. The on-demand system comprises one or more network applications that provide services and support to a customer (e.g., business) without the customer having to host the system on their premises. That is, the service provider hosts (e.g., offers, provides, implements, executes, or performs one or more operations of) the systems and the customer can access functionalities online through a software-as-a-service (SaaS) model. The on-demand systems may include, for example, services and support for supply chain management, human resource management, customer relationship management (CRM), financial and accounting management, compliance management, supplier relationship management, software management, or any other form of management.

Initially, generic graphical user interfaces (GUIs) may be provided to each of the clients for the same applications by the server system 105. However, as the server system 106 tracks behavior (e.g., user interactions and user modifications) of each user associated with the client 102, the server system 106 may provide recommendations to customize the GUI to each client 102 for each application. For example, if a user almost always creates a sales order for a particular country (e.g., Spain) by entering a code for Spain in a particular input field, the server system 106 may recommend a GUI where the input field is prefilled with the code for Spain. The server system 106 will be discussed in more detail in connection with FIG. 2, while the client 102 will be discussed in more detail in connection with FIG. 3 below.

The environment 100 of FIG. 1 is merely an example, and alternative embodiments may comprise any number of clients 102 communicatively coupled to any number of server systems 106. Furthermore, components and functions of the server system 106 and the client 102 may be combined, separated, or located elsewhere in the environment 100 (e.g., some components shown as part of the client 102 may be located at the server system 106 or vice-versa).

Figure 2:
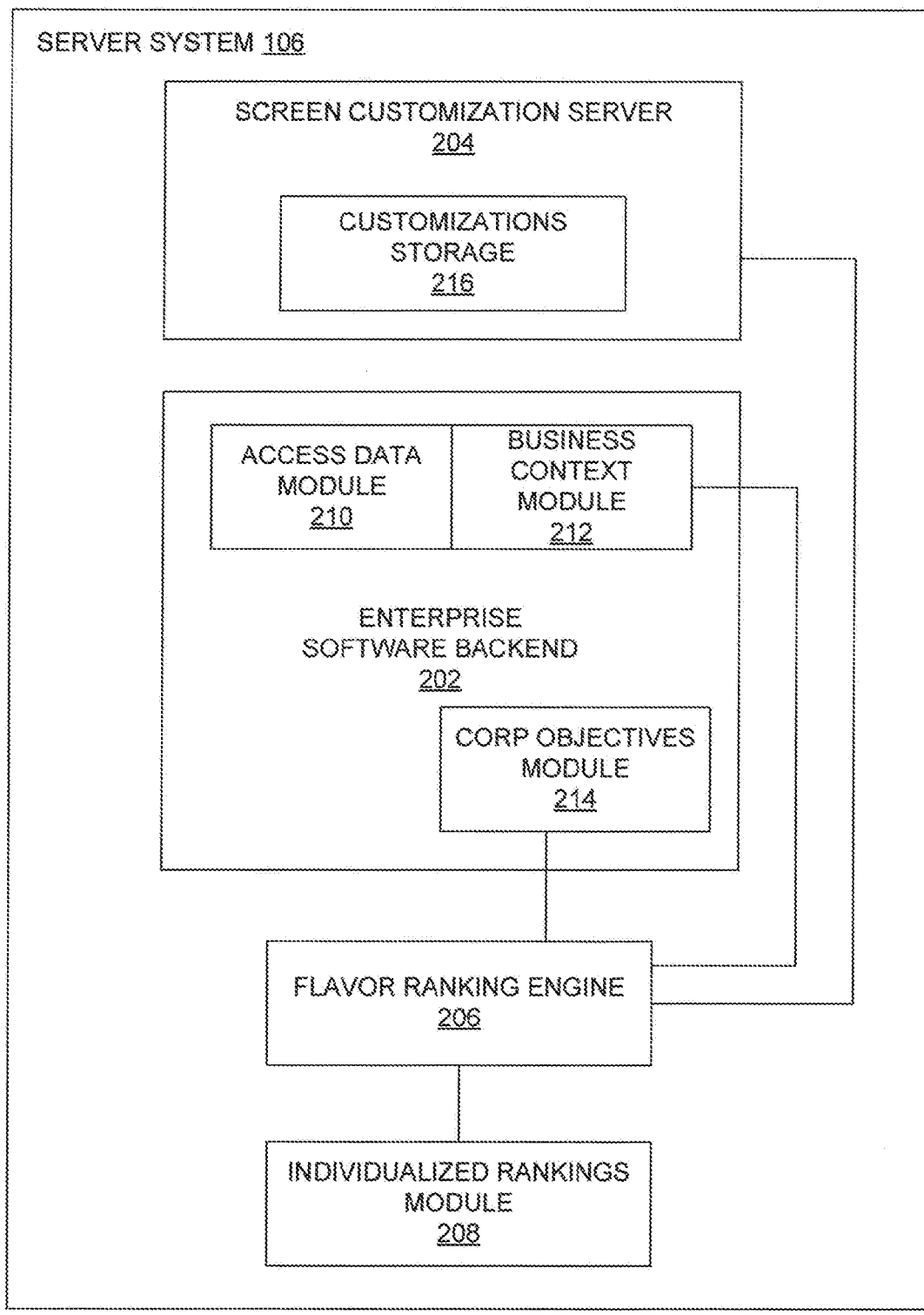
FIG. 2 is a block diagram illustrating components of server system of the environment of FIG. 1.

FIG. 2 is a block diagram illustrating the server system 106 in further detail. In example embodiments, the server system 106 provides enterprise software functionality to the client 102 including providing information for rendering of screens (GUIs) on the client 102. The information may include recommendations for customizations of the screens. Accordingly, the server system 106 may comprise an enterprise software backend 202, a screen customization server 204, a flavor ranking engine 206, and an individualized ranking module 208, all of which may be communicatively coupled together. It is noted that unnecessary components for functionalities of example embodiments of the present invention are not shown.

The enterprise software backend 202 comprises logic for applications that are provided to the client 102 by the server system 106. That is, the enterprise software backend 202 provides instructions to the client 106 with respect to applications and screens that should be rendered based on the applications that are being served to the client 102. It is noted that while, in one embodiment, the enterprise software backend 202 may be an enterprise resource planning (ERP) component, any type of client-server application may be implemented.

The screen customization server 204 receives tracked user interactions and tracked rendered changes from the client 102. In some embodiments, the tracked data may be in the form of customization models or customization rules 310 that are formatted for storage in a customizations storage 216. The customization rules 310 may include recommendations that are derived for the user based on user interactions and previous tracked rendering changes by a component of the client 102. Alternatively, the screen customization server 204 may derive the customizations based on the received tracked data. Subsequently, the stored customizations may be provided to the client 102 for automatic customization of screens and provided to the flavor ranking engine 206 for determining available flavors and for ranking of the available flavors.

The flavor ranking engine 206 ranks flavors (e.g., previously customized user interfaces) based on context and behavior of the specific user. In some embodiments, the flavor ranking engine 206 considers access rights of the user and business context information extracted from the enterprise software backend 202 in ranking the flavors for the user. As such, an access data module 210 determines access rights for the user. The access rights may be determined based on the user's authorization role. The access data module 210 may also determine role access and definitions as well as flavors that have been previously accessed by the user.

Additionally, a business context module 212 determines the context information extracted from the enterprise software backend 202 for the user. The context information may comprise, for example, hiring date, gender, job title, department, and colleagues of the user, as well as reorganization history.

In one embodiment, an application provided by the enterprise software backend 202 is a human resources (HR) application. As such, the business context module 212 may look at user groups and identify, for example, that ninny of the users hired in a same time frame as the current user or who are German by nationality (like the current used have soccer pictures on their screens. As such, any flavor involving soccer may be ranked higher by the flavor ranking engine 206 for the current user. Thus, the flavor ranking engine 206 can, in addition to looking at a user's behavior, also look at data that is available in HR based on the user's title, nationality, gender, hire date, or any other attribute that would be known to HR.

The flavor ranking engine 206 may also consider corporate objectives obtained from a corporate objectives module 214. The corporate objectives may include obtaining correct data and increasing user throughput. As such, the corporate objectives module 214 may track faulty inputs and detect if something went wrong. For example, error messages may be tracked by the corporate objectives module 214. The corporate objectives module 214 may also track higher user throughputs based on measured time to perform a transaction. Thus, if particular flavors provide better data output or higher user throughput, these flavors may be ranked higher by the flavor ranking engine 206.

Using the various user and corporate specific inputs from the enterprise software backend 202 and stored customizations from the customization storage 216, the flavor ranking engine 206 determines flavors that are applicable to the user and provides them in a ranked order (e.g., in a flavor gallery). The individualized ranking module 208 may store the individualized rankings, generate the flavor gallery based on the output of the flavor ranking engine 206, and provide the flavor gallery to the client 102 for display.

Figure 3:
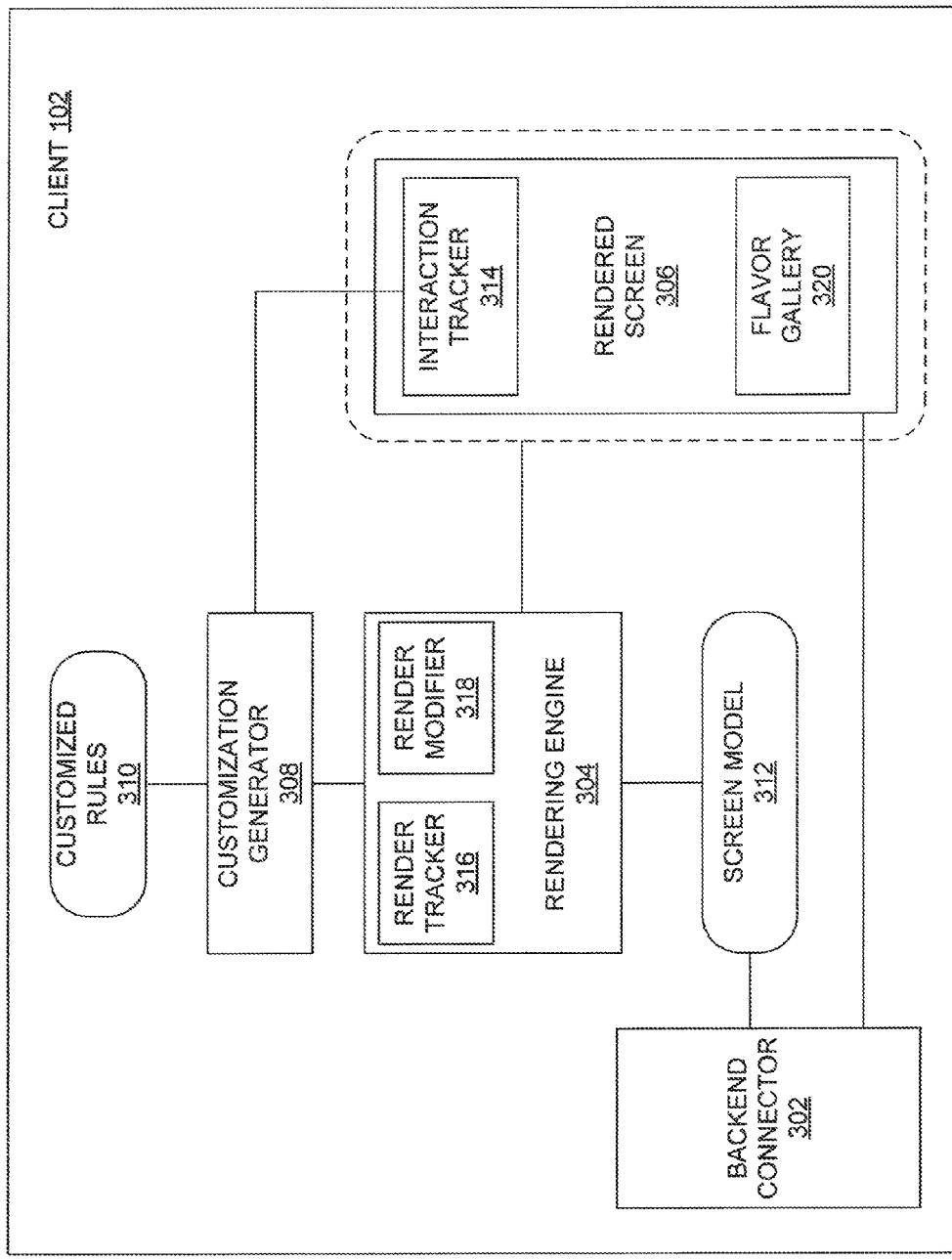
FIG. 3 is a block diagram illustrating components of a client of the environment of FIG. 1.

FIG. 3 is a block diagram illustrating components of the client 102. The client 102 comprises a user device that renders the screens of an application for the user. The client 102 also comprises components that communicate with the server system 106 and tracks rendered elements and user interactions with the elements. Accordingly, the client 102 comprises a backend connector 302, a rendering engine 304, a rendered screen 306 (e.g., on a display of the client 102), and a customization generator 308 having or applying customized rules 310, all communicatively coupled together.

The backend connector 302 receives information from the enterprise software backend 202. Because the screens are provided in a browser, the information may need to be converted in order to be sent over the network 104 (e.g., over the Internet) and displayed on a browser display. The backend connector 302 operates as a translator for the data from the enterprise software backend 202 by translating the data into a language or format that a front end understands. The front end is represented by the rendered screen 306.

The rendering engine 304 receives the data from the enterprise software backend 202 and renders the data to produce the rendered screen 306. As such, the rendering engine 304 receives a screen model 312 for an application from the backend connector 302. The screen model 312 is a data model of the screen received from the enterprise software backend 202. Thus, the screen model 312 is a description of a visual component of the rendered screen 306. For example, the screen model 312 may indicated where a particular button is located and what color it is. The text of the screen model 312 is converted by the rendering engine 304 to generate the visual component of the rendered screen 306.

The display showing rendered screen 306 is associated with an interaction tracker 314 that tracks all user interactions with the rendered screen 306. Tracked user interactions are sent by the interaction tracker 314 to the customization generator 308. The customization generator 308 modifies the tracked information in a structured manner for storing on the server system 106. The tracked user interactions may include, for example, clicks or selections of elements (e.g., buttons, tabs) and data that is entered in input fields. Other tracked observations may include screens opened, transactions opened, controls interacted with, flavors selected, flavors switched (e.g., frequency and total), user input speed, and erroneous inputs (e.g., frequency, number, location).

In addition, the rendering engine 304 comprises a rendering tracker 316. The rendering tracker 316 tracks changes applied by the rendering engine 304 (e.g., change to a background color). The tracked rendering data is also passed to the customization generator 308, which formats the data into a structured foment for storage in the server system 106.

The customization generator 308 may also generate customization rules 310 that are models that may be applied to the screens. For example, if 80% of the time the background is modified to pink by the user, the customization generator 308 may create a rule that indicates that all GUIs should have a pink background for the user. The rule may be stored so that it can always be applied. Thus, the customization generator 308 is a core component that receives all the tracked data, creates the customization rules 310, stores the customization rules 310 (e.g., to the server system 106 and locally), and applies the customization rules 310. Accordingly, the customization generator 308 manages recommendations that are system derived for the user.

The rendering engine 304 also comprises a rendering modifier 318. The rendering modifier 318 automatically applies recommendations (also referred to as "customizations") based on the tracked user interactions and the tracked changes applied by the rendering engine 304. For example, the background may be automatically, without user instruction, made pink by the rendering engine 304 based on past tracked background changes to pink for the user. Thus, the rendering engine 304 receives the screen model 312 and requests any available flavors or changes (e.g., recommendations) that may be applicable for the user (e.g., from the stored customizations of the screen customization server 204 or the customization rules 310 from the customization generator 308). Accordingly in some embodiments, the rendering modifier 318 automatically applies the recommendations to the screen model 312. In some instances, the rendering modifier 318 may also query whether the user likes the automatically applied recommendations.

In other embodiments, the user is presented with recommendations in the form of a flavor gallery 320. For example, the user may select a flavor gallery button and a list of flavors that have been created in the system are presented (e.g., in a pop-up window). The flavors may be rated or ranked according to the context and behavior of the specific user. The ranking will be discussed in more detail in connection with FIG. 6 below. The user may then select one or more flavors (e.g., customizations that were previously created) to be used as their customized screens. Additionally, the user may further customize the selected flavors, thus creating a new flavor.

Figure 4:
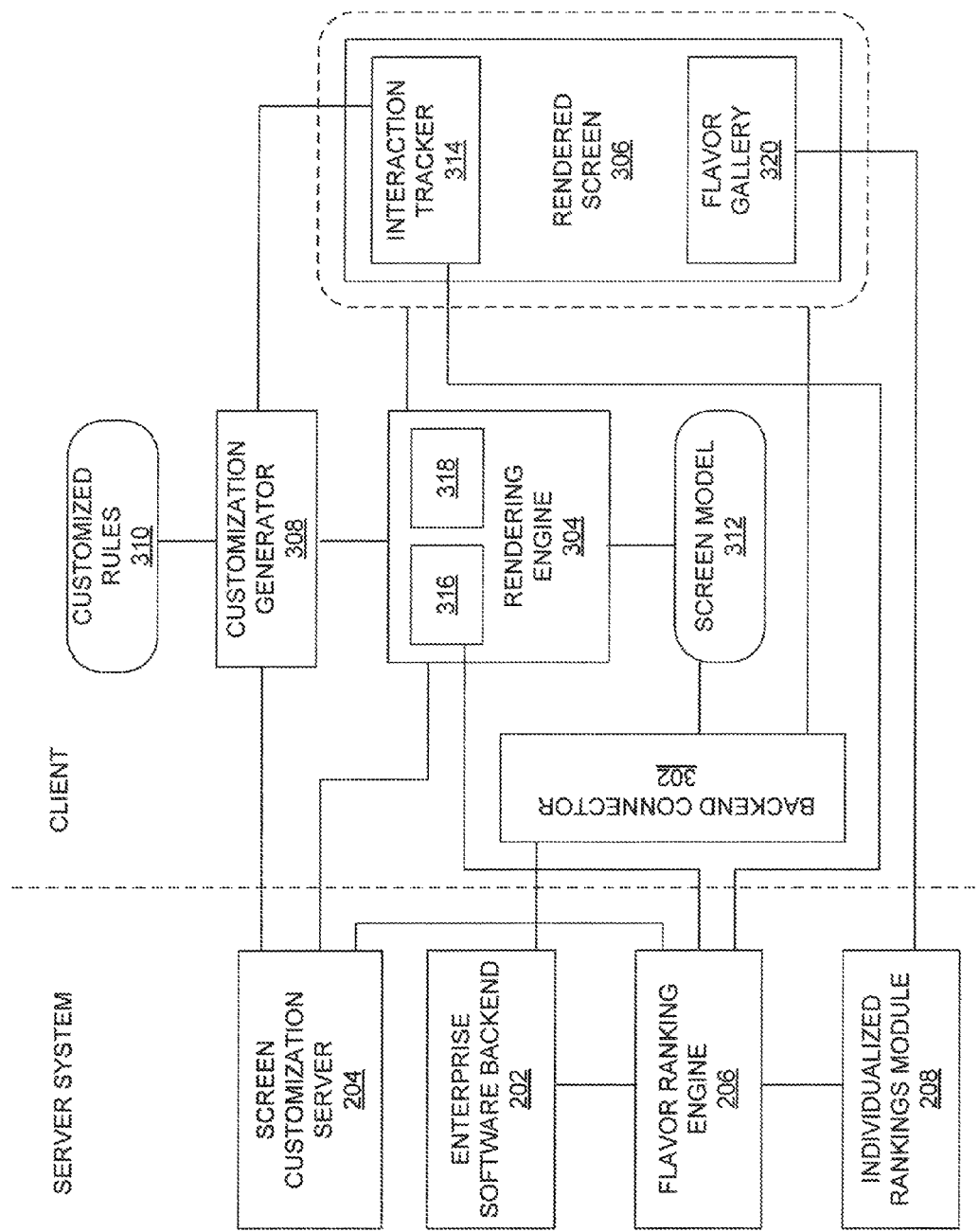
FIG. 4 is a block diagram illustrating interactions between the components of the server system and the client.

FIG. 4 is a block diagram illustrating interactions between the components of the server system 106 and the client 102. As shown, the backend connector 302 receives and translates instructions in the form of the screen model 312 from the enterprise software backend 202. The screen model 312 is provided to the rendering engine 304, which may apply customizations via the rendering modifier 318. The customizations may be previously selected customizations by the user (e.g., the customization rules 310), current manual modifications by the user, or automatically implemented recommendations that the screen customization server 204 determines may be applicable to the user.

The rendered screen 306 is displayed to the user. Any further changes to the components on the screen (e.g., removing a tab, moving a button, changing background color) may be detected by the rendering tracker 316 and provided to the customization generator 308. Subsequently, the customization generator 308 may generate a customization rule based on the tracked rendering changes and store the new customization rule. In some embodiments, the customization or customization rule is stored to the screen customization server 204 on the server system 106. Additionally, any user interactions with the screen are tracked by the interaction tracker 314. Such interactions may include, for example, tabs or buttons that the user consistently selects and values that are almost always entered into a particular input field. These tracked interactions are also provided to the customization generator 308, which can generate customizations models and customization rules 310 that are stored for later retrieval and use.

In further embodiments, the flavor ranking engine 206 accesses the tracked data for the specific user (e.g., the customizations stored in the screen customization server 204), flavors stored on the system (e.g., from the screen customization server 204), and context information extracted from the enterprise software backend 202 (e.g., access data business context data, corporate objectives) to rank the flavors for the specific user. The individualized ranked list of flavors is then provided by the individualized ranking module 208, for example, as a flavor gallery 320. In one embodiment, new flavors may also be provided and distinguished by the individualized ranking module 208, for example, in a pop-up window with an indication that one or more new flavors are available or highlighted.

Figure 5:
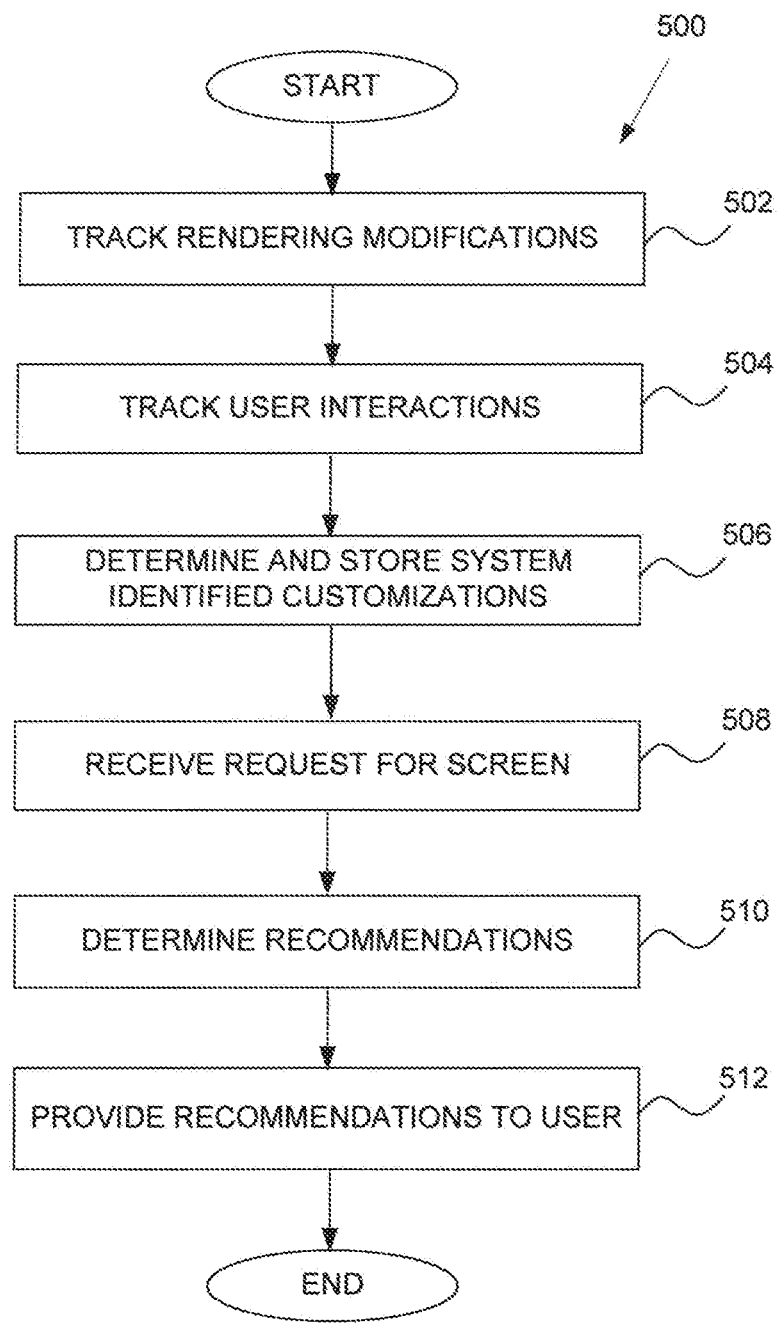
FIG. 5 is a flowchart of an example method for providing graphical user interface recommendations.

FIG. 5 is a flowchart of an example method 500 for providing a graphical user interface recommendation to a user. In operation 502, user rendering modifications are tracked. In example embodiments, each time a user modifies a screen (e.g., moves a button or tab, adds an image, changes a background color), the rendering tracker 316 tracks the modification performed on the screen. Using this tracked data, consistently applied modifications may be identified (e.g., by the customization generator 308).

In operation 504, user interactions with the screen are tracked. In example embodiments, the interaction tracker 314 tracks the user interactions. User interactions may include, for example, a button or tab that is selected or a value that is entered into an input field. Using this tracked data, buttons or tabs that are almost always selected or values that are usually inputted may be identified.

In operation 506, system identified customizations are determined and stored. In example embodiments, the tracked data tracked rendering data from operation 502 and tracked user interaction data from operation 504) may be provided to the customization generator 308. The customization generator 308 may generate customization rules 310 based on the tracked data. For example, if the user appears to always change the background to pink (based on the tracked rendering data), then the customization generator 308 may generate a customization rule that all subsequent backgrounds should be made pink for this user. In another example, if the user appears to always enter a country code of Spain in a sales order form (based on the tracked user interaction data), then the customization generator 308 may generate a customization rule that indicates that the country code of Spain should be prefilled the sales order form for this user. The tracked data or customization rules 310 may be provided to the server system 106 for storage.

It is noted that the amount of time needed to track user interactions and modifications varies by users. That is, user behavior based recommendations (e.g., based on user interactions and user modifications) may be made after a certain amount of data points have been collected that would indicate likely preferences for the user. However, recommendations based on group data points (e.g., users with similar attributes as the current user such as gender, department, hire date, nationality) may be provided without any user-specific tracked data.

In operation 508, a request for a screen is received. The request may be in the form of a request to run a particular application that is stored at the enterprise software backend 202. In response, recommendations for screen customization are determined for the specific user in operation 510. The recommendation determination process will be discussed in more detail in connection with FIG. 6 below.

Once the recommendations for screen customization are determined, the recommendations are provided in operation 512. In some embodiments, the recommendations may be automatically applied by the rendering engine 304 to the screen. In these embodiments, the user may be notified of the customization and allowed to change or indicate acceptance/denial of the customization. In other embodiments, the recommendations may be suggested to the user. For example, the recommendations may be provided in a flavor gallery, which is a list of customized graphical user interfaces that have been previously created and rated according to user-specific attributes.

Figure 6:
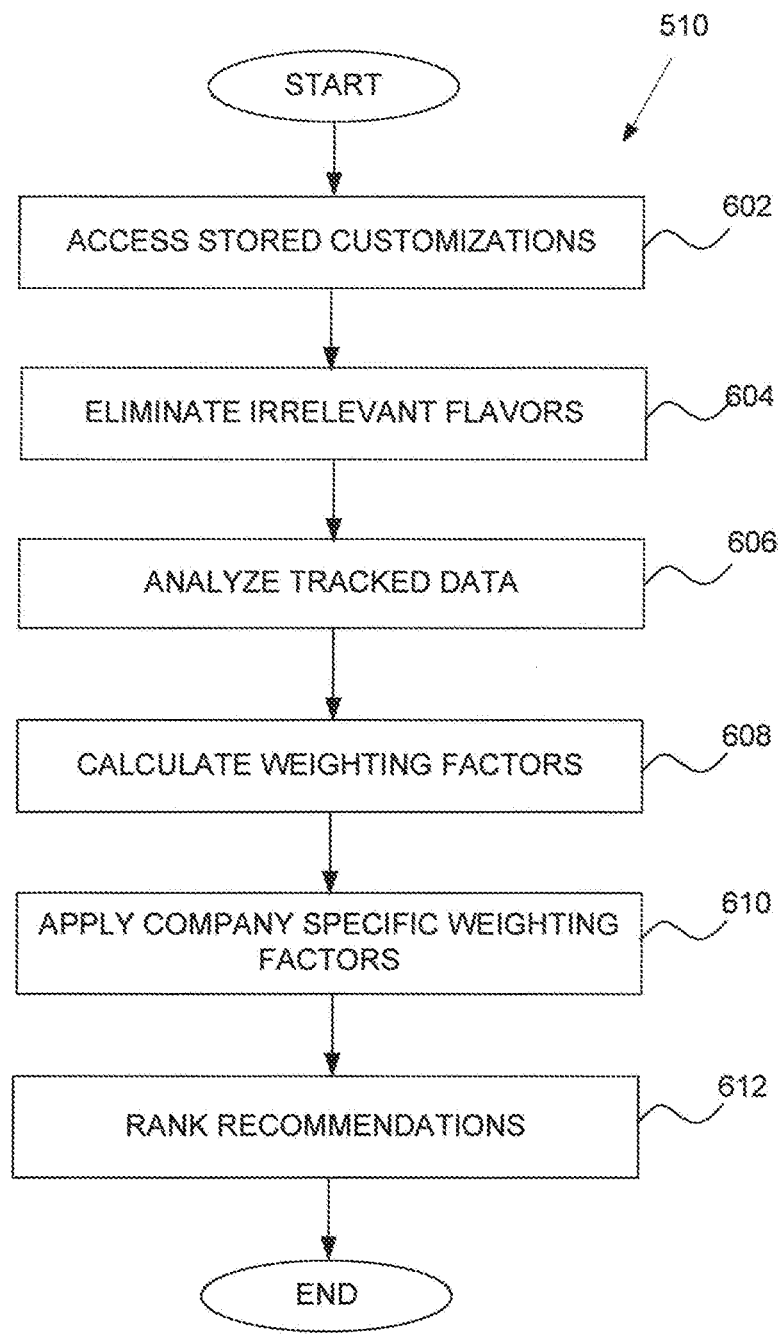
FIG. 6 is a flowchart of an example method for determining graphical user interface recommendations to recommend.

FIG. 6 is a flowchart of an example method for determining GUI recommendations for a specific user (operation 510). In operation 602, stored customizations are accessed. The stored customizations may comprise previously created customizations for the specific user. For example, the user may have manually created customized screens. Additionally, the customization generator 308 may have generated customizations for the user based on tracked user interactions and tracked rendering modifications (e.g., background is usually made pink, Spain code is usually entered in country field of sales order). In some embodiments, these customizations may be provided to the rendering engine 304 and automatically applied to the screen model 312. In other embodiments, these recommendations, which may be flavors (e.g., previously created customized screens) ranked for presentation in a flavor gallery.

In order to rank the recommendations, in operation 604, irrelevant recommendations or flavors are eliminated and only applicable flavors are included. For example, flavors that the user already uses do not need to be recommended. Additionally, flavors that the user cannot use (e.g., based on access rights) are eliminated. For example, a look up of a role definition of the user may be performed to determine what the user can potentially access and corresponding flavors may be added to the list. As such, flavors the user has not yet added to his profile (e.g., currently using), flavors that the user has access rights for, flavors which apply to current transactions (e.g., based on the application being accessed), and flavors that are a part of the user's role definitions may be compiled into the list.

In operation 606, tracked data is analyzed. The tracked data may be retrieved, for example, from the customizations storage 216. The tracked data may include which components or controls of the screens the user interacts with more often than not (e.g., tracked user interactions). The list of flavors may be updated to prioritize flavors that include at least some or all of the highly used user interactions. For example, if the user almost always clicks five particular buttons on a screen, flavors that do not have these five buttons may be ranked lower.

In operation 608 weight factors are calculated by the flavor ranking engine 206. The flavor ranking engine 206 may consider gender, title, department, and other factors that provide context information. For example, an average rating of a flavor may be adjusted by initially setting the rating factor to W=1. Then, ratings for flavors used by colleagues that share the same gender may be emphasized (e.g., W=W*1.05). Similarly, ratings of flavors used by users sharing the same title as the specific user may be emphasized (e.g., W=W*1.1). Ratings for flavors used by colleagues in the same department as the specific user may be emphasized (e.g., W=W*1.2), and ratings for flavors generally used by employees who have been with the company a comparable amount of time may be emphasized (e.g., W=W*1.05). Ratings for flavors that include screens that the user generally interacts with may be emphasized (e.g., W=W*1.5) and rating for flavors that involve transactions that the user commonly uses may be emphasized (e.g., W=W*1.5). The various weighting examples are merely provided for illustration and other weighting scenarios may be contemplated. It is also noted that the weighting factors provided are merely examples and that any weighting value may be used.

While user specific weight factors are considered in operation 608, operation 610 applies company specific weighting factors. These company specific weighting factors take into consideration corporate objectives from the corporate objectives module 214. For example, flavors that lead to a higher number of faulty inputs (e.g., error rate >20%) may be deemphasized (e.g., W=W*0.5). In another example, flavors that lead to a higher transaction throughput may be emphasized (e.g., W=W*1.5).

In operation 612, the recommendations may be ranked or rated against each other (e.g., for display in the flavor gallery). In some cases, manual ratings by other users may be considered. In one embodiment, the final rating may be the average user rating multiplied by the weighting factor determined in operations 608 and 610. The flavors may then be ordered according to their ratings in the flavor gallery or any other mechanism for providing recommendations of customized GUIs to the user. While certain operations are identified as occurring in the server system 106 or in the client 102, alternative embodiments may provide the operations in either the server system 106 or the client 102.

Figure 7:
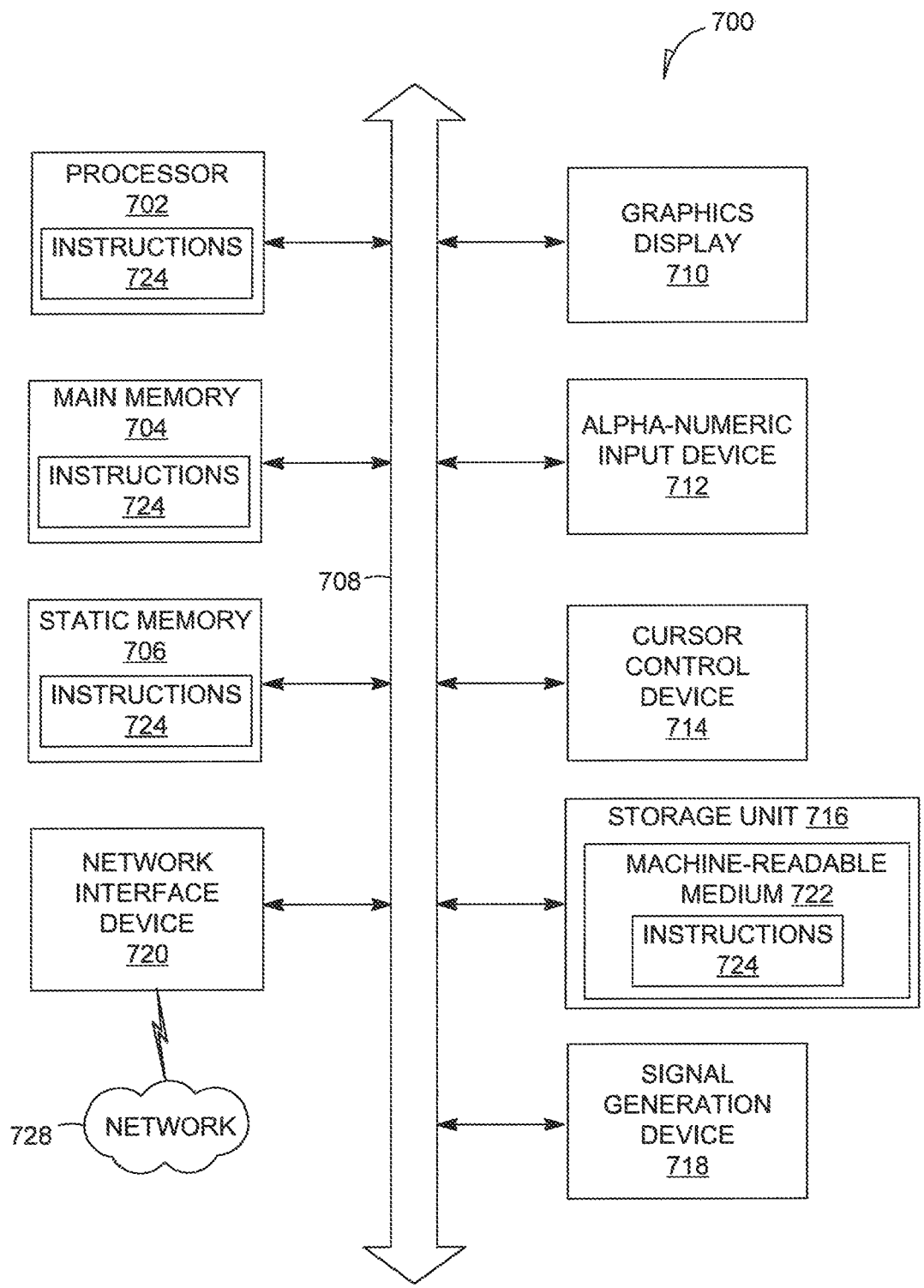
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving tracking data associated with automatically tracked actions performed by a specific user at a device of the specific user with respect to at least one generic screen;
identifying, from the automatically tracked actions, regularly occurring tracked user modifications performed by the specific user to a particular element of the at least one generic screen, the regularly occurring tracked user modifications performed by the specific user including a repeated same user modification performed by the specific user to the particular element of the at least one generic screen;

determining, using a processor of a machine, one or more recommendations of a customized screen for an application based at least in part on the regularly occurring tracked user modifications performed by the specific user to the particular element of the at least one generic screen, the determining comprising:
  calculating weighting factors based on user context information, the weighting factors being higher for screens that involve transactions that the user commonly uses, and
  applying the weighting factors based on the user context information to the one or more recommendations to generate a ranked list of recommendations; and
providing the one or more recommendations of the customized screen for the application to the specific user, the customized screen comprising a generic screen having the repeated same user modification performed by the specific user automatically applied to the particular element to create the customized screen.

2. The method of claim 1, wherein the providing of the one or more recommendations comprises causing automatic application, without user instruction, of the recommendation of the customized screen having the repeated same modification performed by the specific user automatically applied.

3. The method of claim 2, further comprising querying the specific user as to whether the specific user likes a result of the automatic application of the recommendation.

4. The method of claim 1, wherein the providing of the one or more recommendations comprises causing a listing of a plurality of recommendations to be displayed to the specific user in a pop-up window.

5. The method of claim 4, further comprising ranking the plurality of recommendations in the listing based in part on the tracking data associated with the automatically tracked actions.

6. The method of claim 1, wherein the tracking data associated with the automatically tracked actions comprises a customization, the customization generated based on the regularly occurring tracked user modifications identified from the tracking data.

7. The method of claim 1, wherein the determining of the one or more recommendations of the customized screen further comprises:
  calculating weighting factors based on corporate objectives; and
  applying the weighting factors based on the corporate objects to the one or more recommendations to generate a ranked list of recommendations.

8. The method of claim 1, wherein the determining of the one or more recommendations of the customized screen comprises eliminating recommendations that do not apply to the specific user based on the user context information and user access rights.

9. The method of claim 1, wherein the application comprises an application served from an enterprise software backend of a server.

10. The method of claim 1, wherein the automatically tracked actions performed at the device of the specific user with respect to the at least one generic screen is at a second application that is different from the application for which the one or more recommendations of the customized screen is provided.

11. The method of claim 1, further comprising automatically tracking user interactions performed with respect to the at least one generic screen.

12. The method of claim 1, further comprising automatically tracking modifications performed during rendering of the at least one generic screen.

13. The method of claim 1, wherein:
the regularly occurring tracked user modifications used to determine the one or more recommendations comprise input of a same value repeatedly in a particular field by the specific user, and
at least one of the one or more recommendations includes the same value prepopulated in the particular field.

14. The method of claim 1, wherein:
the regularly occurring tracked user modifications used to determine the one or more recommendations comprise repeated selection of a same tab by the specific user, and
at least one of the one or more recommendations orders the repeatedly selected tab more prominently.

15. The method of claim 1, wherein:
the regularly occurring tracked user modifications used to determine the one or more recommendations comprise repeated use of a particular color as a background color by the specific user, and
at least one of the one or more recommendations provides the particular color as the background color.

16. The method of claim 1, further comprising:
causing storage of a customization at a server, wherein the determining the one or more recommendations comprises accessing the storage for the stored customization.

17. The method of claim 1, wherein:
the regularly occurring tracked user modifications used to determine the one or more recommendations comprises repeated non-selection of a same tab by the specific user, and
at least one of the one or more recommendations removes the repeatedly non-selected tab.

18. A machine-readable storage medium having no transitory signals and storing instructions which, when executed by at least one processor of a machine, cause the machine to perform operations comprising:
  receiving tracking data associated with automatically tracked actions performed by a specific user at a device of the specific user with respect to at least one generic screen;
  identifying, from the automatically tracked actions, regularly occurring tracked user modifications performed by the specific user to a particular element of the at least one generic screen, the regularly occurring tracked user modifications performed by the specific user including a repeated same user modification performed by the specific user to the particular element of the at least one generic screen;
  determining one or more recommendations of a customized screen for an application based at least in part on regularly occurring tracked user modifications performed by the specific user to a particular element of the at least one generic screen, the determining comprising:
    calculating weighting factors based on user context information, the weighting factors being higher for screens that involve transactions that the user commonly uses, and
    applying the weighting factors based on the user context information to the one or more recommendations to generate a ranked list of recommendations; and
  providing the one or more recommendations of the customized screen for the application to the specific user, the customized screen comprising a generic screen having the repeated same user modification performed by the specific user automatically applied to the particular element to create the customized screen.

19. The machine-readable storage medium of claim 18, wherein the providing of the one or more recommendations comprises causing automatic application, without user instruction, of the recommendation of the customized screen having the repeated same user modification performed by the specific user automatically applied.

20. The machine-readable storage medium of claim 18, wherein the providing of the one or more recommendations comprises causing a listing of a plurality of recommendations to be displayed to the specific user in a pop-up window.

21. The machine-readable storage medium of claim 20, wherein the determining of the one or more recommendations of the customized screen further comprises:
    calculating weighting factors based on corporate objectives in order to rank the plurality of recommendations; and
    applying the weighting factors based on the corporate objectives to the one or more recommendations to generate a ranked list of recommendations.

22. A system comprising:
one or more processors of a machine configured to perform operations comprising:
    receiving tracking data associated with automatically tracked actions performed by a specific user at a device of the specific user with respect to at least one generic screen;
    identifying, from the automatically tracked actions, regularly occurring tracked user modifications performed by the specific user to a particular element of the at least one generic screen, the regularly occurring tracked user modifications performed by the specific user including a repeated same user modification performed by the specific user to the particular element of the at least one generic screen;
    determining one or more recommendations of a customized screen for an application based at least in part on regularly occurring tracked user modifications performed by the specific user to a particular element of the at least one generic screen, the determining comprising:
        calculating weighting factors based on user context information, the weighting factors being higher for screens that involve transactions that the user commonly uses, and
        applying the weighting factors based on the user context information to the one or more recommendations to generate a ranked list of recommendations; and
    providing the one or more recommendations of the customized screen for the application to the specific user, the customized screen comprising a generic screen having the repeated same user modification performed by the specific user automatically applied to the particular element to create the customized screen.

* * * * *